(12) United States Patent
Klein, Jr. et al.

(10) Patent No.: US 11,591,700 B2
(45) Date of Patent: Feb. 28, 2023

(54) ELECTROLYZERS FOR THE REDUCTION OF CARBON DIOXIDE TO FORMATE

(71) Applicant: Alliance for Sustainable Energy, LLC, Golden, CO (US)

(72) Inventors: Walter Ellis Klein, Jr., Bailey, CO (US); Kenneth Charles Neyerlin, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 2 days.

(21) Appl. No.: 17/159,736

(22) Filed: Jan. 27, 2021

(65) Prior Publication Data
US 2021/0246562 A1   Aug. 12, 2021

Related U.S. Application Data

(60) Provisional application No. 62/988,207, filed on Mar. 11, 2020, provisional application No. 62/972,166, filed on Feb. 10, 2020.

(51) Int. Cl.
| | |
|---|---|
| *C25B 9/23* | (2021.01) |
| *C25B 11/032* | (2021.01) |
| *C25B 3/25* | (2021.01) |
| *C25B 13/00* | (2006.01) |

(52) U.S. Cl.
CPC .................. *C25B 9/23* (2021.01); *C25B 3/25* (2021.01); *C25B 11/032* (2021.01); *C25B 13/00* (2013.01)

(58) Field of Classification Search
None
See application file for complete search history.

(56) References Cited

U.S. PATENT DOCUMENTS

| | | |
|---|---|---|
| 4,488,948 A | 12/1984 | Larson et al. |
| 2015/0369415 A1 | 12/2015 | Bond, Jr. et al. |

FOREIGN PATENT DOCUMENTS

| | | | |
|---|---|---|---|
| WO | 2017014635 A1 | 1/2017 | |
| WO | WO-2018054646 A1 * | 3/2018 | ............... C25B 1/10 |

OTHER PUBLICATIONS

Jeanty et al. (Journal of $CO_2$ Utilization 24 (2018) 454-462). (Year: 2018).*
Agarwal, A. et al., "The Electrochemical Reduction of Carbon Dioxide to Formate/Formic Acid: Engineering and Economic Feasibility," Full Papers, ChemSusChem, vol. 4, 2011, pp. 1301-1310.
Albo, J. et al., "Towards the electrochemical conversion of carbon dioxide into methanol," RSC Green Chemistry, vol. 17, 2015, 21 pages.

(Continued)

*Primary Examiner* — Wojciech Haske
(74) *Attorney, Agent, or Firm* — Michael A. McIntyre (57) ABSTRACT

The present disclosure relates to an electrochemical flow cell that includes a gap positioned between an ion exchange membrane (IEM) and a cathode gas diffusion electrode (GDE), where the gap is positioned to contain a liquid and the gap has a thickness value, as defined by the distance between the IEM and the cathode GDE, of between greater than zero mm and less than about 2.0 mm. In some embodiments of the present disclosure, the gap may be between about 0.1 mm and about 1.0 mm.

11 Claims, 10 Drawing Sheets

(56) References Cited

OTHER PUBLICATIONS

Fuel Cell Technologies, Inc., http://fuelcelltechnologies.com/single-cell-hardware/cell-hardware/25-square-centimeter-cell-hardware, accessed Mar. 9, 2021, 8 pages.
Garg, S. et al., "Advances and challenges in electrochemical CO2 reduction processes: an engineering and design perspective looking beyond new catalyst materials," Journal of Materials Chemistry A, 2019, 34 pages.
Irtem, E. et al., "Low-energy formate production from CO2 electroreduction using electrodeposited tin on GDE," Journal of Materials Chemistry A, vol. 4, 2016, 7 pages.
Kibria, M.G. et al., "Electrochemical CO2 Reduction into Chemical Feedstocks: From Mechanistic Electrocatalysis Models to System Design," Advanced Materials Review, vol. 31, 2019, 24 pages.
Lei, T. et al., "Continuous electroreduction of carbon dioxide to formate on Tin nanoelectrode using alkaline membrane cell configuration in aqueous medium," Elsevier Catalysis Today, vol. 318, 2018, pp. 32-28.
Li, Y.C. et al., "Bipolar Membranes Inhibit Product Crossover in CO2 Electrolysis Cells," vol. 2, 2018, 5 pages.
Li, T. et al., "Electrolytic Conversion of Bicarbonate into CO in a Flow Cell," Joule, vol. 3, Jun. 19, 2019, pp. 1487-1497.
Liang, S. et al., "Electrolytic cell design for electrochemical CO2 reduction," Elsevier Journal of CO2 Utilization, Review Article, https://doi.org/10.1016/j.jcou.2019.09.007, 2019, 16 pages.
Liu, K. et al., "Introductory Guide to Assembling and Operating Gas Diffusion Electrodes for Electrochemical CO2 Reduction," ACS Energy Letters, vol. 4, 2019, pp. 639-643.
Loiudice, A. et al., "Tailoring Copper Nanocrystals Towards C2 Products in Electrochemical CO2 Reduction," Angewandte Chemie International Edition, Communications, vol. 55, 2016, pp. 5789-5792.
Mitsushima, S. et al., "Membrane Electrolysis of Toluene Hydrogenation with Water Decomposition for Energy Carrier Synthesis," Electrocatalysis, vol. 7, 2016, pp. 127-131.
Ramdin, M. et al., "High-Pressure Electrochemical Reduction of CO2 to Formic Acid / Formate: Efffectof pH on the Downstream Separation Process and Economics," Ind. Eng. Chem. Res., vol. 58, 2019, pp. 22718-22740.
Salvatore, D.A. et al., "Electrolysis of Gaseous CO2 to CO in a Flow Cell with a Bipolar Membrane," ACS Energy Letters, vol. 3, 2018, pp. 149-154.
Song, J.T. et al., "Towards Higher Rate Electrochemical CO2 Conversion: From Liquid-Phase to Gas-Phase Systems," Catalysts, vol. 9, 2019, 25 pages.
Wang, B. et al., "A dot matrix and sloping baffle cathode flow field of proton exchange membrane fuel cell," Elsevier Journal of Power Sources, vol. 434, 2019, 12 pages.
Weng, L-C. et al., "Towards membrane-electrode assembly systems for CO2 reduction: a modeling study," RSC Energy Environmental Science, vol. 12, 2019, 19 pages.
White, J.L. et al., "Photons to formate: Efficient electrochemical solar energy conversion via reduction of carbon dioxide," Elsevier Journal of CO2 Utilization, vol. 7, 2014, 5 pages.
Yang, W. et al., "Design of Electrocatalysts and Electrochemical Cells for Carbon Dioxide Reduction Reactions," Advanced Materials Technologies, Review, vol. 3, 2018, 20 pages.

\* cited by examiner

electrochemical flow cell
ELECTROLYZERS FOR THE REDUCTION OF CARBON DIOXIDE TO FORMATE

CROSS-REFERENCE TO RELATED APPLICATIONS

This application claims priority from U.S. Provisional Patent Application Nos. 62/972,166 and 62/988,207 filed on Feb. 10, 2020 and Mar. 11, 2020, respectively, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is an electrochemical flow cell that includes a gap positioned between an ion exchange membrane (IEM) and a cathode gas diffusion electrode (GDE), where the gap is positioned to contain a liquid, the gap has a thickness value, as defined by the distance between the IEM and the cathode GDE, of between greater than zero mm and less than about 2.0 mm. In some embodiments of the present disclosure, the gap may be between about 0.1 mm and about 1.0 mm.

In some embodiments of the present disclosure, the gap filled with the liquid may provide a conductivity of greater than about 5 S/m. In some embodiments of the present disclosure, the electrochemical flow cell may further include a cathode flow plate, where the cathode GDE is positioned between the IEM and the cathode flow plate, and the cathode flow plate includes a serpentine flow path. In some embodiments of the present disclosure, the electrochemical flow cell may further include at least two contacts configured to estimate a voltage drop across the electrochemical cell.

BACKGROUND

Several studies on $CO_2$ reduction have been performed, however studies have not focused on the development of a viable and scalable hardware architecture that would enable this reaction to take place at industrial relevant current densities and therefore improve the overall practicality of this process. Most studies were tested in hardware adopted from other applications, e.g., fuel cells, half cells, and water electrochemical flow cells. Lacking suitable hardware specifically designed for the reduction of $CO_2$ has, among other things, limited the long-term operation of $CO_2$ reduction systems and has prevented the identification of electrode degradation mechanisms. In addition, when an electrolyte layer is used between the membrane and cathode, an ohmic loss is introduced by the electrolyte layer, causing an extremely high cell voltage. Other issues arising from improperly designed hardware includes flooding of the gas diffusion electrodes (GDEs), inhibiting the inability to reach high current densities. Thus, there remains a need for electrochemical flow cells designed for the efficient and economic electrochemical reduction of $CO_2$ to useful intermediates and products.

BRIEF DESCRIPTION OF THE DRAWINGS

Some embodiments are illustrated in referenced figures of the drawings. It is intended that the embodiments and figures disclosed herein are to be considered illustrative rather than limiting.

REFERENCE NUMBERS

100 . . . electrochemical flow cell
105 . . . ion exchange membrane (IEM)
106 . . . cation exchange layer (CEL)
107 . . . anion exchange layer (AEL)
108 . . . separator
110 . . . cathode gas diffusion electrode (cathode GDE)
111 . . . cathode gas diffusion layer (cathode GDL)
112 . . . cathode catalyst layer
115 . . . anode gas diffusion electrode (anode GDE)
116 . . . anode gas diffusion layer
117 . . . anode catalyst layer
120 . . . flow plate
125 . . . housing
130 . . . current collector
135 . . . anolyte inlet
136 . . . anolyte outlet
140 . . . cathode inlet
141 . . . cathode outlet
145 . . . catholyte inlet
146 . . . catholyte outlet
150 . . . baffled gasket
151 . . . baffle
152 . . . unbaffled gasket
155 . . . gap for aqueous electrolyte mixture
160 . . . voltage contact

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Compared to other $CO_2$ reduction products, formic acid ($CH_2O_2$)/formate salt stands out as one of only two currently economically viable products, with the other being CO. Other $CO_2$ reduction products include $CH_4$, $CH_2O$, $CH_3OH$, $C_2H_4$, $C_2H_4$, $C_2H_4O$, $C_2H_4O_2$, $C_2H_5OH$, $C_2H_6O_2$, $C_2H_2O_2$, $C_3H_6O$, $C_3H_6O_3$, and $C_3H_7OH$. Thus, the present disclosure relates to devices, systems, and methods for producing one or more of these $CO_2$ reduction products, including formic acid, via electrochemical flow cells as described herein. Some of the possible half-reactions for the reduction of $CO_2$ to useful products are summarized in Table 1 below. This list is not inclusive and other half-reactions completed using at least some of the aspects of the electrochemical flow cells described herein, to produce one or more other products, fall within the scope of the present disclosure.

TABLE 1

Example of $CO_2$ reduction reactions.

| Possible half-reactions of electrochemical $CO_2$ reduction | Electrode potentials (V vs SHE) at pH 7 |
|---|---|
| $CO_2 (g) + e^- \rightarrow {}^*COO^-$ | −1.90 |
| $CO_2 (g) + 2H^+ + 2e^- \rightarrow HCOOH (l)$ | −0.61 |
| $CO_2 (g) + H_2O (l) + 2e^- \rightarrow HCOO^- (aq) + OH^-$ | −0.43 |
| $CO_2 (g) + 2H^+ + 2e^- \rightarrow CO (g) + H_2O (l)$ | −0.53 |
| $CO_2 (g) + H_2O (l) + 2e^- \rightarrow CO (g) + 2OH^-$ | −0.52 |
| $CO_2 (g) + 4H^+ + 2e^- \rightarrow HCHO (l) + H_2O (l)$ | −0.48 |
| $CO_2 (g) + 3H_2O (l) + 4e^- \rightarrow HCHO (l) + 4OH^-$ | −0.89 |
| $CO_2 (g) + 6H^+ (l) + 6e^- \rightarrow CH_3OH (l) + H_2O (l)$ | −0.38 |
| $CO_2 (g) + 5H_2O (l) + 6e^- \rightarrow CH_3OH (l) + 6OH^-$ | −0.81 |
| $CO_2 (g) + 8H^+ + 8e^- \rightarrow CH_4 (g) + 2H_2O (l)$ | −0.24 |
| $CO_2 (g) + 6H_2O (l) + 8e^- \rightarrow CH_4 (g) + 8OH^-$ | −0.25 |
| $2CO_2 (g) + 12H^+ + 12e^- \rightarrow C_2H_4 (g) + 4H_2O (l)$ | 0.06 |
| $2CO_2 (g) + 8H_2O (l) + 12e^- \rightarrow C_2H_4 (g) + 12OH^-$ | −0.34 |
| $2CO_2 (g) + 12H^+ + 12e^- \rightarrow CH_3CH_2OH (l) + 3H_2O (l)$ | 0.08 |
| $2CO_2 (g) + 9H_2O (l) + 12e^- \rightarrow CH_3CH_2OH (l) + 12OH^- (l)$ | −0.33 |

Figure 1:
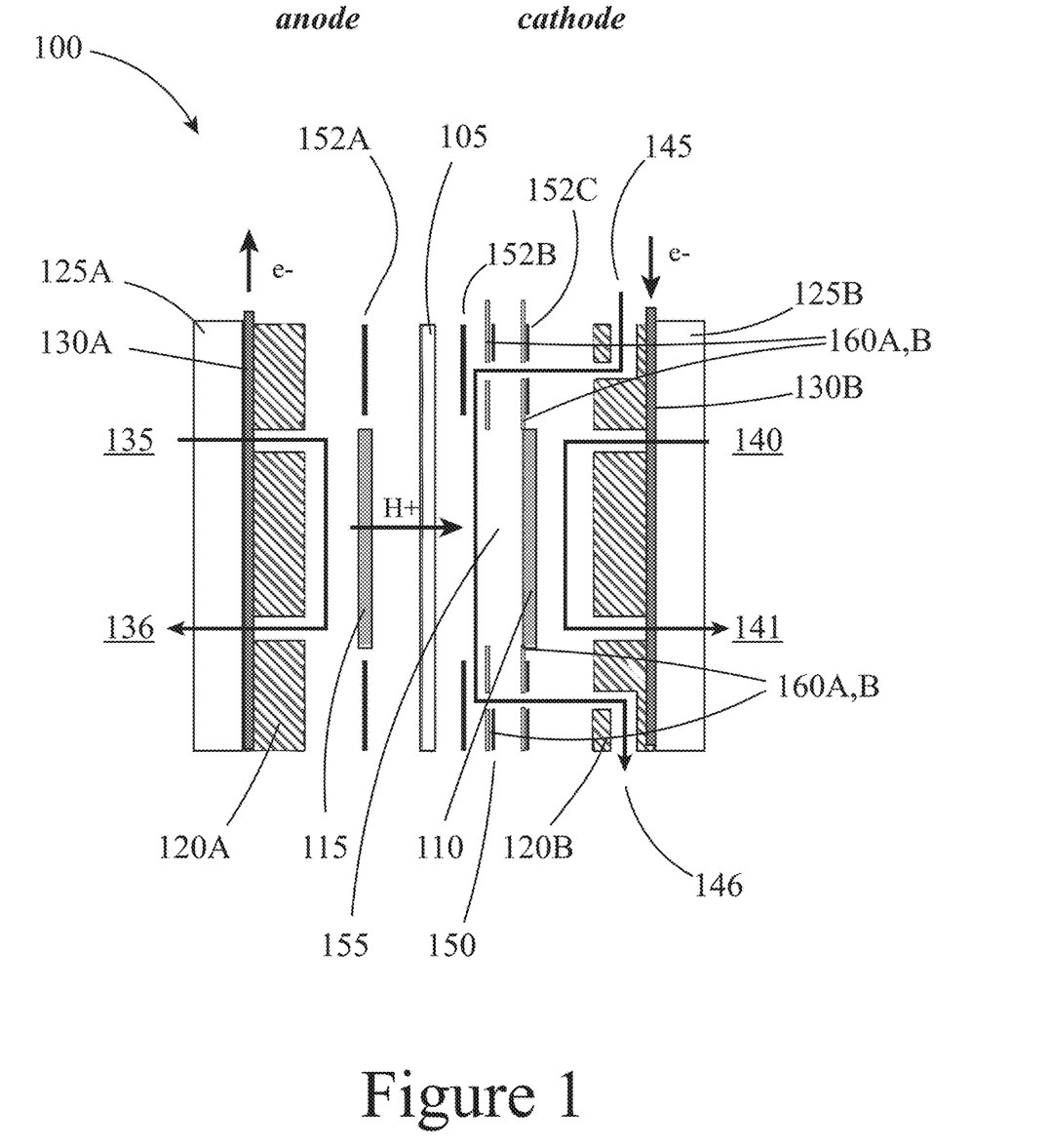
FIG. 1 illustrates a schematic of an electrochemical flow cell for, among other things, the reduction of $CO_2$, according to some embodiments of the present disclosure.

FIG. 1 illustrates an electrochemical flow cell 100, according to some embodiments of the present disclosure. This exemplary electrochemical flow cell 100 includes a cathode and an anode electrically connected to each other by a power source (not shown). The cathode and/or the anode (and their various components), both in a substantially planar form, may be physically held together between a first housing 125A and a second housing 125B, for example, by bolts passing through the entire electrochemical flow cell 100 perpendicularly to the planes of the cathode and the anode (see FIG. 2) or through hydraulic compression. The cathode includes a cathode gas diffusion electrode (GDE) 110 positioned between an ion exchange membrane (IEM) 105 and a flow plate 120B. In some embodiments of the present disclosure, an IEM 105 may have a thickness between 0.01 mm and 0.50 mm or between 0.025 mm and 0.17 mm. A current collector 130B may be positioned between the cathode's housing 125B and the cathode flow plate 120B, electrically connecting the cathode to the circuit (not shown), or the flow plate itself can be used as a current collector. The cathode flow plate 120B may provide an even distribution of $CO/CO_2$ or any other gas and/or $CO_2$/catholyte mixture to the cathode GDE 110, with $CO_2$ or $CO_2$/catholyte provided to the flow plate 120B through $CO_2$ inlet 140, with unreacted $CO_2$ and/or $CO_2$/catholyte and/or gaseous product exiting the cathode flow plate 120B through outlet 141. Liquid products exit through outlet 146. To provide contact with all of the cathode GDE 110 surface are, a cathode flow plate 120B may include a plurality of serpentine channels cut into the surface of the flow plate 120B, enabling $CO_2$ to contact a maximum amount of the cathode GDE 110 surface area, without bypassing portions and/or channeling (see FIG. 3).

Referring again to FIG. 1, in some embodiments of the present disclosure, an electrochemical flow cell 100 may include an electrolyte layer, which may be created by forming a gap 155 between the IEM 105 and the cathode GDE 110 and filling the gap 155 with catholyte. A baffled gasket 150 (baffles not shown), positioned between the IEM 105 and the cathode GDE 110 may form the gap 155, providing a volume for catholyte to flow through, thereby providing operational advantages such as controlling the local pH present at the electrolyte cathode GDE 100 interface. In some embodiments of the present disclosure, the gap 155 may have a thickness between about 0.02 mm and about 0.6 mm, or between about 0.01 mm and about 1.00 mm. Note that a baffled gasket 150 is used in this exemplary electrochemical flow cell 100. However, other physical elements may be used in addition to, or in place of baffles (e.g. dimples, ridges, etc.), and these alternatives fall within the scope of the present disclosure. Among other things, a baffle may provide mechanical support while minimizing bubble formation. Catholyte may enter the electrochemical flow cell and fill the gap 155 through a second inlet 145 constructed in the cathode's flow plate 120B, with channels formed in one unbaffled gasket 152C and aligned with a channel constructed in the flow plate 120B, thereby directing the catholyte into the gap 155, creating the electrolyte (catholyte) layer. The catholyte may then exit the gap 155 through a second channel in the unbaffled gasket 152C, which may be aligned with and lead to a second outlet 146 from the electrochemical flow cell 100. Note that other unbaffled and/or baffled gaskets, e.g. 152B may be provided as needed in the cathode to provide liquid/gas seals between the various elements of the electrochemical flow cell 100. Thus, in some embodiments of the present disclosure, the catholyte inlet 145 may provide a liquid stream that can be used to optimize the local pH at the electrolyte/cathode GDE 110 interface. Liquid products formed in the electrochemical flow cell 100 may then exit through the catholyte outlet 146. Reactant gas, potentially humidified, may be fed into the electrochemical flow cell 100 through the cathode inlet 140. Unreacted reactant gas and gaseous products and/or vapor products may exit the system through the cathode outlet 141.

Referring again to FIG. 1, an anode may include a current collector 130A positioned between an anode housing 125A and a flow plate 120A, such that the anode's current collector 130A is electrically connected to the cathode's current collector 130B by the electrical circuit providing the voltage potential (not shown) needed for the reduction chemistry to occur. Further, the anode may include an anode GDE 115 positioned between the IEM 105 and the anode's flow plate 120A. The anode's flow plate 120A, like the cathode's flow plate 120B, may provide a circuitous path for the anolyte to contact the anolyte with as much of the anode GDE 115 surface area as possible, while minimizing channeling and bypassing. Anolyte (not shown), such as an aqueous KOH solution, may be directed to the electrochemical flow cell 100 at the anolyte inlet 135, which may direct the anolyte to a channel that passes through the housing 125A to the flow plate 120A, which may enable the anolyte to contact the anode GDE 115 with the resultant $H^+$ ions produced flowing through the IEM 105 to the cathode. An unbaffled gasket 152A may provide a liquid and/or gas seal between the flow plate 120, the anode GDE 115, and the IEM 105.

FIG. 1 also illustrates a first voltage contact 160A positioned between gaskets 152B and 150 and a second voltage contact 160B positioned between gaskets 150 and 152C. These voltage contacts (160A and 160B) may be constructed of a conductive metal such as copper, gold, aluminum, and/or silver and may be configured to measure at least one of a resistance and/or a conductivity of the liquid filling the gap 155, thereby enabling the estimating of a resistance and/or conductivity provided by the electrolyte and/or other liquid filling the gap 155.

Figure 2:
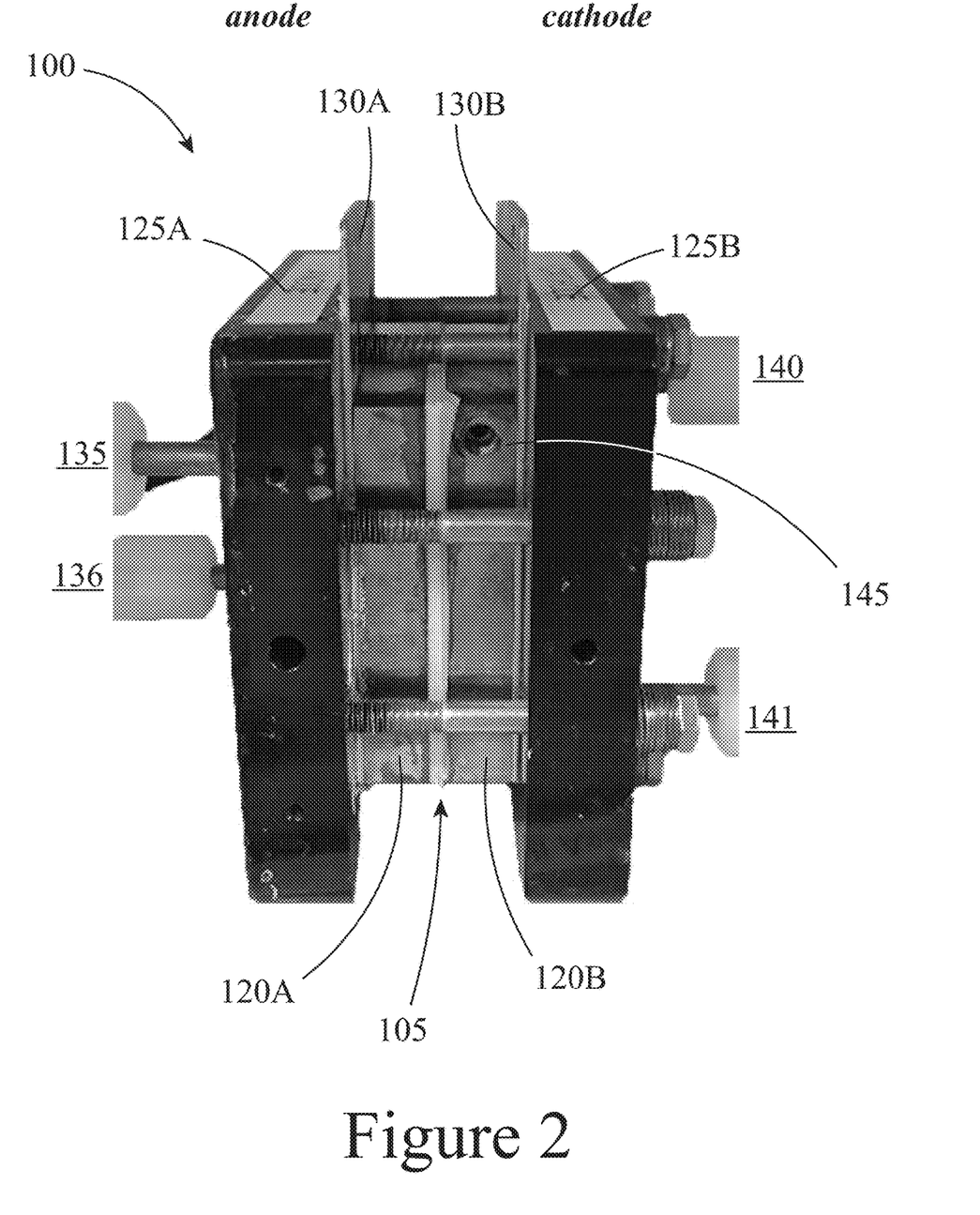
FIG. 2 illustrates an actual electrochemical flow cell utilized for the reduction of $CO_2$, according to some embodiments of the present disclosure.

FIG. 2 illustrates a photograph of a lab-scale version of an electrochemical flow cell 100 like that shown schematically in FIG. 1, according to some embodiments of the present disclosure. In this example, each of the housings (125A and 125B) were constructed of aluminum 6061 or 304 stainless steel, although other metals may be used. In some embodiments of the present disclosure, the cathode flow plate 120B was constructed of titanium grade 2 and included a multiple serpentine flow path similar to that shown in FIG. 3. Catholyte (not shown) was fed through tubing to the catholyte inlet 145 where it was directed to the gap 155 (not shown) positioned between the IEM 105 (not shown) and the cathode GDE 110 (not shown), forming an electrolyte layer. Catholyte was removed from the electrochemical flow cell 100 through the catholyte outlet 146 (not shown), which fed to tubing. $CO_2$ was directed to the cathode through the cathode inlet 140, such that the $CO_2$ was directed to the anode flow plate 120A interfacing with the cathode GDE 110. For the example of formate production, unreacted $CO_2$ and formate produced by the electrochemical flow cell 100, exited the system at the cathode outlet 141. In this example, the $CO_2$-containing cathode inlet 140 and formate-containing cathode outlet 141 were both constructed of tubing.

For the exemplary electrochemical flow cell shown in FIG. 2, a gas flow controller was used to accurately feed gas to the electrochemical cell 100 through the cathode inlet 140. PTFE diaphragm pumps were used to accurately feed liquids to the electrochemical cell 100, for example, the anolyte through the anolyte inlet 135 and catholyte through the catholyte inlet 145. For each stream fed to the electrochemical flow cell, pressure was controlled using a dedicated diaphragm back pressure regulator with an electronic pressure regulator controlling dome pressure. The humidity of the gas fed to cathode inlet 140 was set using a humidity bottle bubbler, and the temperature of the gas was controlled using heat traced lines. Each of the two liquid feeds (e.g. catholyte and anolyte) were heated using appropriate heat exchangers. Thermocouples placed at the inlets (135, 140, and 145) of the electrochemical cell 100 provided temperature control points.

Figure 4:
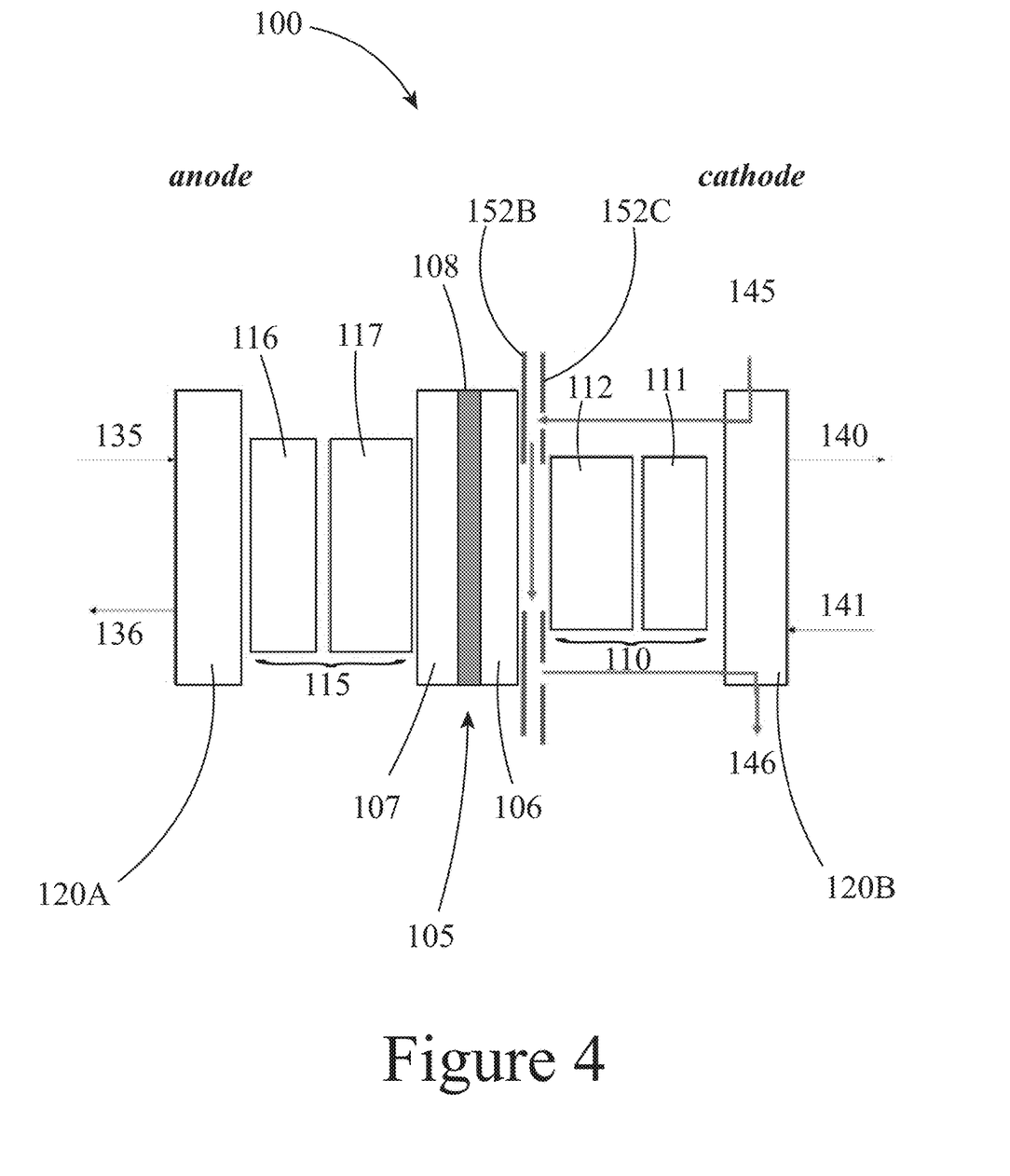
FIGS. 4-6 illustrate additional schematics of electrochemical flow cells, according to some embodiments of the present disclosure.

FIG. 4 provides additional details of an electrochemical flow cell 100, according to some embodiments of the present disclosure. This schematic illustrates that an anode GDE 115 may be constructed of an anode gas diffusion layer (GDL) 116 and an anode catalyst layer 117, where the anode GLD 116 may be positioned between the anode flow plate 120A and the anode catalyst layer 117. Similarly, the cathode GDE 110 may be constructed of a cathode GDL 111 and a cathode catalyst layer 112, where the cathode GLD 111 may be positioned between the cathode flow plate 120B and the cathode catalyst layer 112. Finally, the IEM 105 may be constructed of a separator 108 positioned between a cation exchange layer (CEL) 106 and an anion exchange layer (AEL) 107. In some embodiments of the present disclosure, a cathode GDE 115 may be constructed of carbon.

Figure 5:
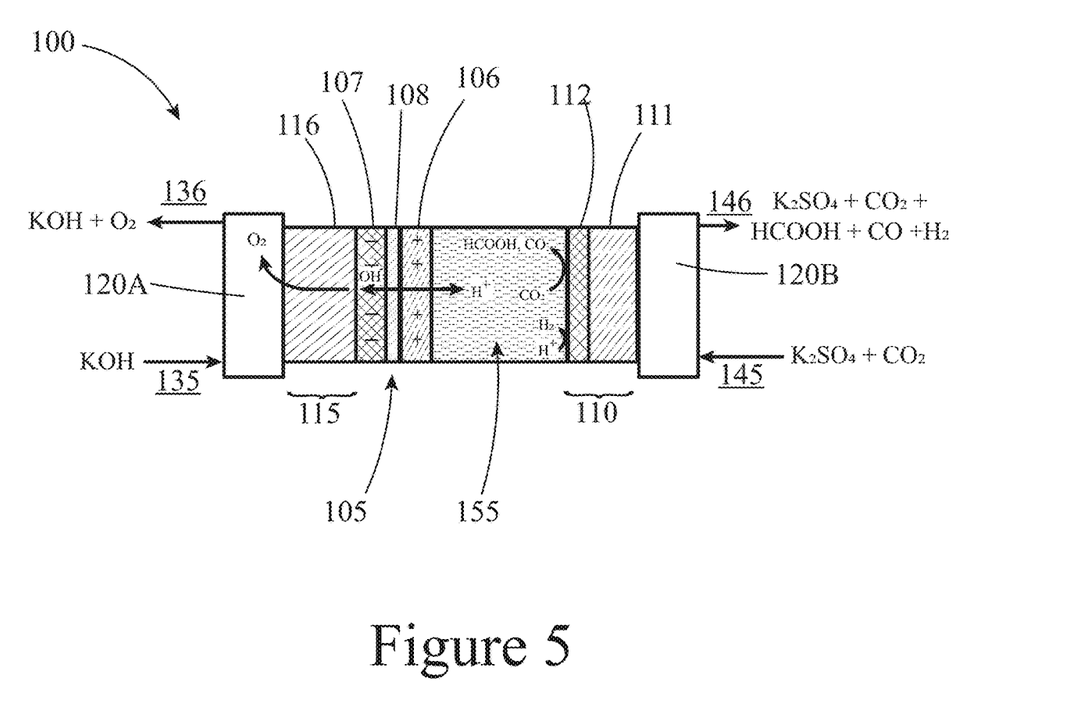

FIG. 5 provides more details of the electrochemical flow cells described herein, according to some embodiments of the present disclosure. Referring to FIG. 5, a flow plate 120A for an anode may be constructed of titanium stainless steel (SS), nickel, graphite, copper, and/or any other suitable conductive material. An anode flow plate 120A, constructed of nickel, for example, may be constructed to provide a flow field that sufficiently contacts as much of the anode GDE 115 surface area is possible, with minimal bypassing or channeling. In some embodiments of the present disclosure, the surface area of an anode GDE 115 may be between 1 $cm^2$ and 50 $cm^2$ and scaled up as needed. In some embodiments of the present disclosure, the gap 155 between the IEM 105 and the cathode GDE 110 may have a thickness between about 0.02 mm and about 0.6 mm, or between about 0.01 mm and about 1.00 mm. An anode flow plate 120A may have a flow field defined by a plurality of channels engraved into the surface of the anode flow plate 120A that contacts the anode GDE 115.

Referring again to FIG. 5, an anode GDL 116 may be constructed of nickel foam where, in some embodiments of the present disclosure, the nickel foam provides the catalytic activity for the oxygen evolution reaction (OER). In some embodiments of the present disclosure, an anode GDL 116 may include a porous transport layer, as gas may not be diffusing on the anode side of the electrochemical cell 100. A cathode GDL 111 may be constructed of at least one of porous carbon or metal (e.g. titanium, nickel, and/or stainless steel), felt, and/or sintered material. A cathode catalyst layer 112 may be constructed of at least one of a metal oxide (e.g. $SnO_2$), copper, nickel, silver, gold, and/or any other suitable metal. In some embodiments of the present disclosure, a cathode GDL 111 may be constructed of, among other things, at least one of SIGRACET® GDL and/or AvCarb®. The CEL 106 of an IEM 105 may be constructed of, among other things, at least one of Nafion™, a FuMA-Tech Membrane, an Orion Polymer membrane, and/or a Sustainion® membrane. The separator 108 of an IEM 105 may be constructed of, among other things, graphene oxide. In some embodiments of the present disclosure, when a bipolar membrane is utilized, the bipolar membrane may be constructed of Fumasep® FBM.

Figure 3:
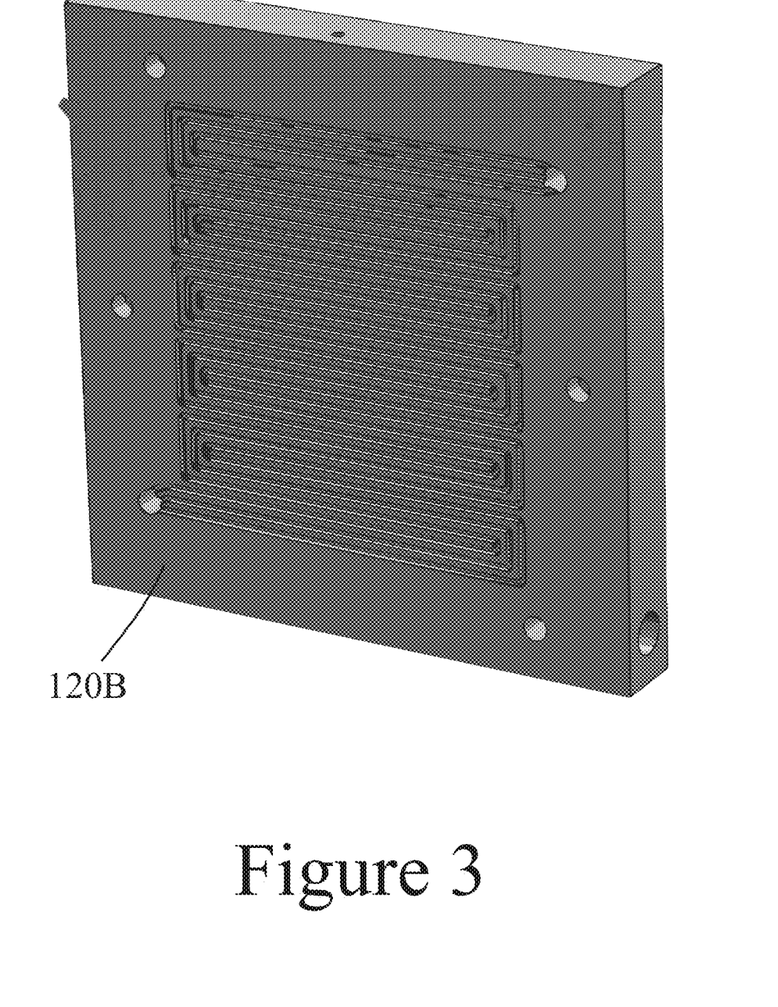
FIG. 3 illustrates a serpentine flow path design for electrolyte flow through a cathode flow plate, according to some embodiments of the present disclosure.
Figure 6:
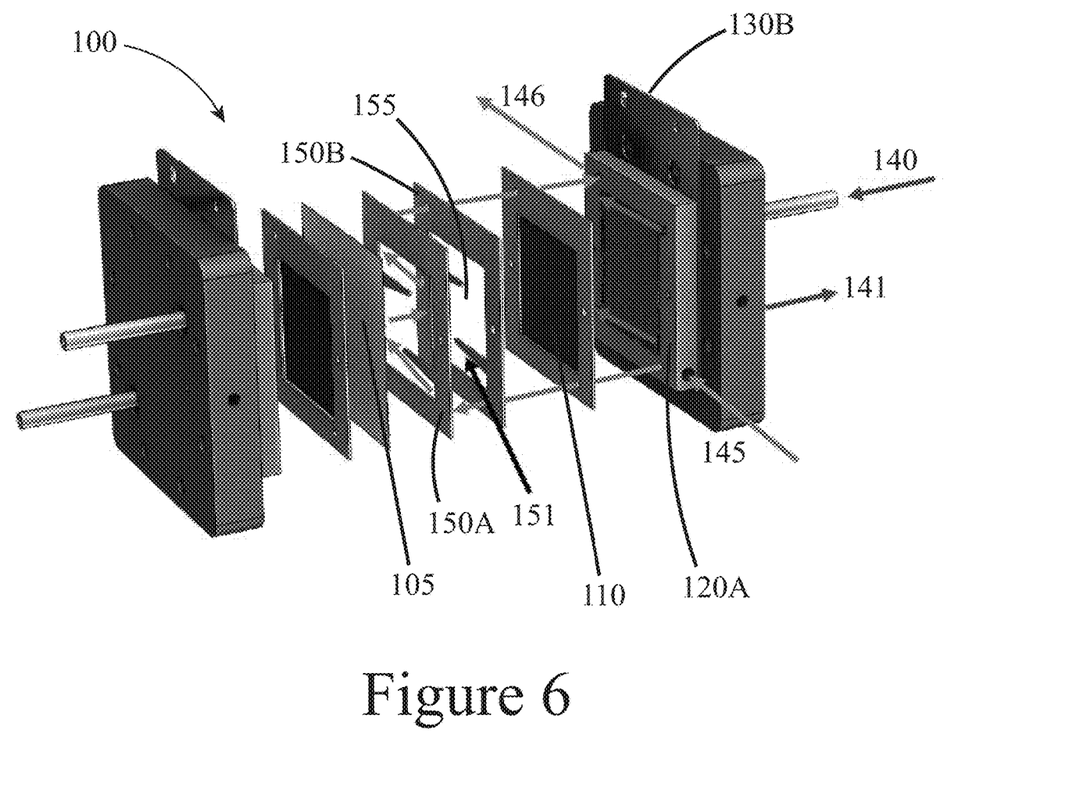

FIG. 6 illustrates exemplary flow paths of materials through the cathode side of an electrochemical flow cell 100, according to some embodiments of the present disclosure. $CO_2$ may be directed to the cathode inlet 140, where it may be fed to the cathode flow plate 120B, where it may be directed through a serpentine flow path as shown in FIG. 3. After flowing through the serpentine flow path, any remaining $CO_2$ and/or products, may exit the electrochemical flow cell 100 through the cathode outlet 140. Catholyte, e.g. an electrolyte, may simultaneously be directed to a catholyte inlet 145, where it may be directed to the gap 155 positioned between the IEM 105 and the cathode GDE 110, having a thickness as defined by the baffled gaskets 150A and 150B. The catholyte may be directed to the gap 155 through passages/holes fabricated directly into the flow plate 120B and that pass through the gaskets. Once in the gap 155, the catholyte may be directed and redirected through the gap 155 by baffles 151 fabricated as part of the gaskets. Next, the catholyte may be directed out of the electrochemical flow cell 100 through passages passing through the gaskets and the cathode flow plate 120B to exit at the catholyte outlet 146.

Figure 7A:
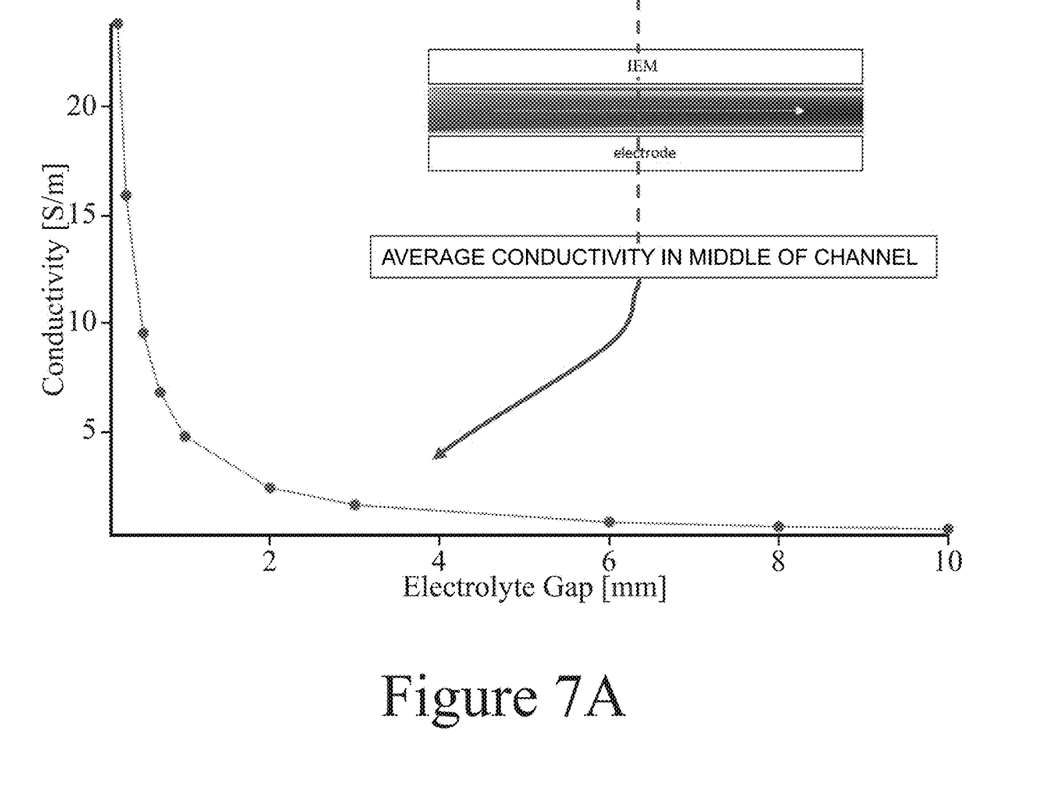
FIGS. 7A and 7B illustrates modeling results for the conductivity of an electrolyte filling a gap between an ion exchange membrane and a cathode gas diffusion electrode, as a function of the gap thickness, according to some embodiments of the present disclosure.
Figure 7B:
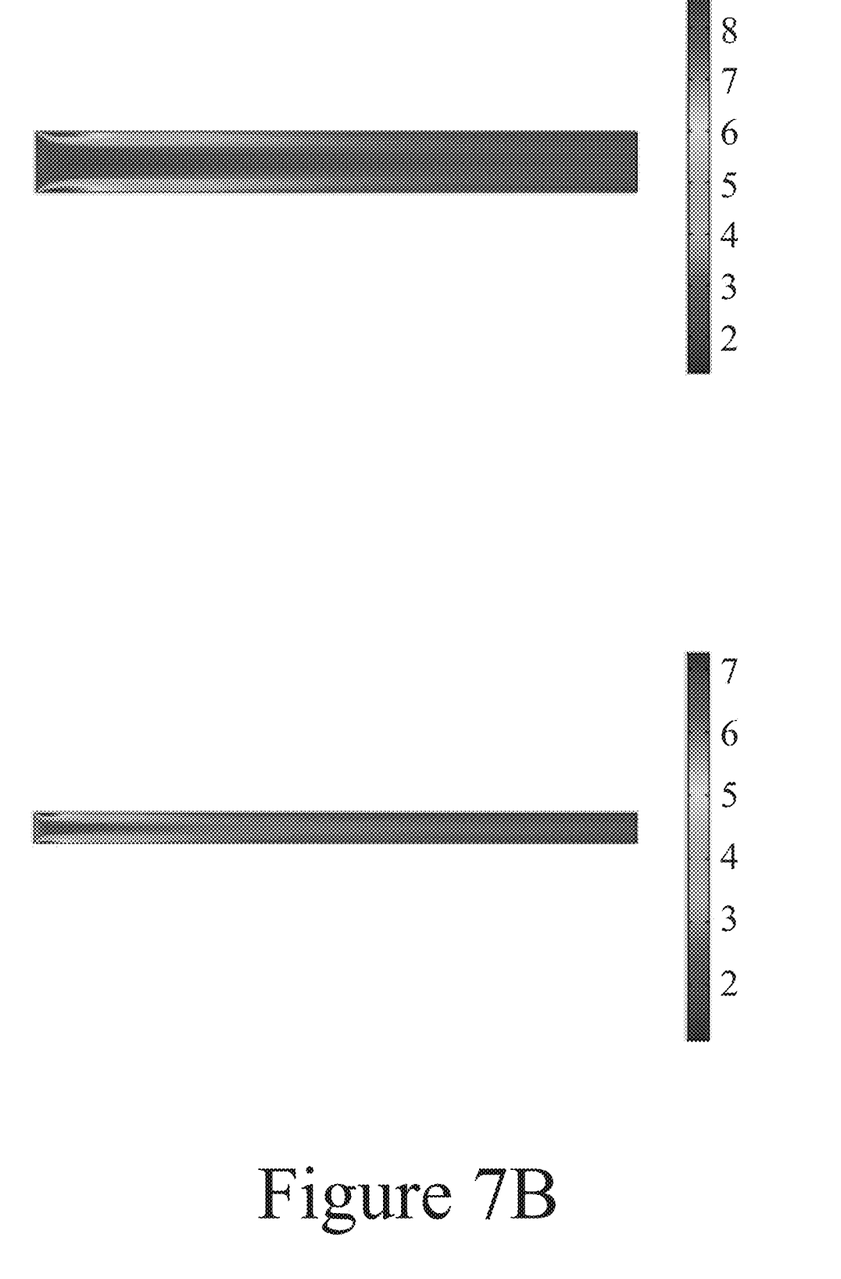

FIGS. 7A and 7B illustrate modeling results of the conductivity provided by a catholyte positioned in the gap 155 of an electrochemical flow cell 100 as described herein, as a function of the thickness/width of the gap 155. These results were obtained by computational fluid dynamics (CFD). FIG. 7A illustrates that the loss in conductivity, for the exemplary system, reaches a substantially linear relationship for thicknesses greater than 2 mm and that to maximize conductivity, the gap should be maintained at a thickness of less than 2 mm, or less than 1 mm, or at a thickness between greater than zero mm and 2 mm, or between 0.5 mm and 2.0 mm. The CFD model is based on an aqueous KOH as the catholyte, an isothermal system, and fixed concentration and pressure boundary conditions. It was also assumed that only $OH^-$ ions can pass in and out of the domain in the y-direction, and a current density of 20 mA/cm² was used. The following governing equations were used in the CFD model:

$$u = u \cdot \hat{x} + v \cdot \hat{y} + w \cdot \hat{z}$$

$$v = 0; w = 0$$

$$J_i = J_{ix} \cdot \hat{x} + J_{iy} \cdot \hat{y}$$

$$\rho u \cdot \nabla u = pI + \mu \nabla^2 u$$

$$\nabla \cdot u = 0$$

$$\nabla \cdot J_i = 0$$

$$J_i = N_i + c_i u$$

$$N_i = -z_i u_i F c_i \nabla \phi - D_i \nabla c_i$$

$$\sum_i z_i c_i = 0$$

$$\kappa = F^2 \sum_i z_i^2 u_i c_i$$

Each variable is defined as follows:
J is total molar flux of ions
N is molar flux minus convection of ions
u is the velocity field
p is pressure
$\phi$ is the electric potential
$c_i$ is concentration of species i
$z_i$ is valency
F is faraday's constant
$u_i$ is the mobility of species
$D_i$ is diffusivity of species i
p is the mass density
I is the identity tensor FIG. 7B illustrates two-dimensional heat plots corresponding to conductivity obtained from the CFD model for two different thicknesses, corresponding to a 1 mm by 1 cm channel and 0.5 mm by 1 cm channel, top and bottom, respectively.

Thus, among other things, the present disclosure relates to novel and scalable electrochemical cell architectures, which may be used to produce, among other things, formate from the electrochemical reduction of $CO_2$. Benefits of the improved electrochemical flow cell designs described herein, include increased conductivities and/or exceptional durability after continuous operating of the electrochemical flow cells.

As shown herein, the cell architectures described above are particularly robust and scalable for the electrochemical reduction of $CO_2$ ($CO_2$R) to formate. In one design, a faradaic efficiency of up to about 90% for the conversion of $CO_2$R to formate at 500 mA/cm² was realized at a 25 cm² cathode gas diffusion electrode (GDE) with a carbon-supported $SnO_2$ electrocatalyst. A 1.27 mm wide gap for the catholyte 155 was used between the ion exchange membrane 105 and cathode GDE 110, which in some embodiments of the present disclosure, may be reduced in thickness to the order of tens of micrometers. A ten-hour stability test was performed using this exemplary device at 150 mA cm⁻².

Two different cell architectures were studied. The first one (not shown), was a full membrane electrode assembly (MEA) based on the integration of the components of conventional fuel cell electrodes using typical fuel cell hardware. In this architecture, the ion exchange membrane 105 was in direct contact with the catalyst-containing electrodes that were positioned between the gas diffusion (porous transport) layers (111 and 116) and 25 cm² triple serpentine flow fields. An important aspect of such a design was that the cation exchange layer 106 of the IEM 105 was in direct contact with the cathode GDE 110, limiting ohmic losses as ions were conducted from the membrane directly to the electrode. To facilitate ion transport in the electrodes, two kinds of membrane electrode assemblies (MEAs) with ionomers of different functionalities were fabricated and tested. In this first configuration, when a proton-conducting ionomer (Nafion™) was utilized in the electrode, the FE of $CO_2$ reduction to formate was <5%, with the bulk of the current going toward the hydrogen evolution reaction (HER). Under an applied electric field, $H^+$ produced from water dissociation at the IEM 105 junction migrated toward the cathode, resulting in a pH between 0 and 1 near the cathode catalyst layer surface. This high concentration of $H^+$ in the cathode GDE promoted HER kinetics while suppressing the desired $CO_2$ reduction reaction.

In an effort to mitigate the low pH at the cathode, an anion exchange ionomer was incorporated into the cathode GDE 110 creating an anionic MEA. With the same $SnO_2$ loading of 0.5 mg $cm^{-2}$, at current densities of <100 mA $cm^{-2}$, the selectivity toward formate was an order of magnitude higher than that obtained with the Nafion™ ionomer in the cathode. This result suggests that the anion exchange ionomer in the cathode GDE 110 effectively increases the local pH in the cathode catalyst layer, suppressing the HER and thereby improving $CO_2R$ selectivity. However, this benefit is not without limitations, as the formate FE dropped to <5% at current densities of >100 mA $cm^{-2}$. At these higher current densities, the anion exchange ionomer in the cathode GDE 110 runs out of capacity to offset the local acidity, which is inevitable because the amount of $H^+$ produced at the IEM 105 junction and transported to the cathode is in proportion to the current density. Consequently, it may not feasible to achieve high $CO_2R$ selectivity at high current densities with this first cell design, as $CO_2R$ was not able to compete kinetically with the HER due to a high local acidity in the cathode.

Figure 8:
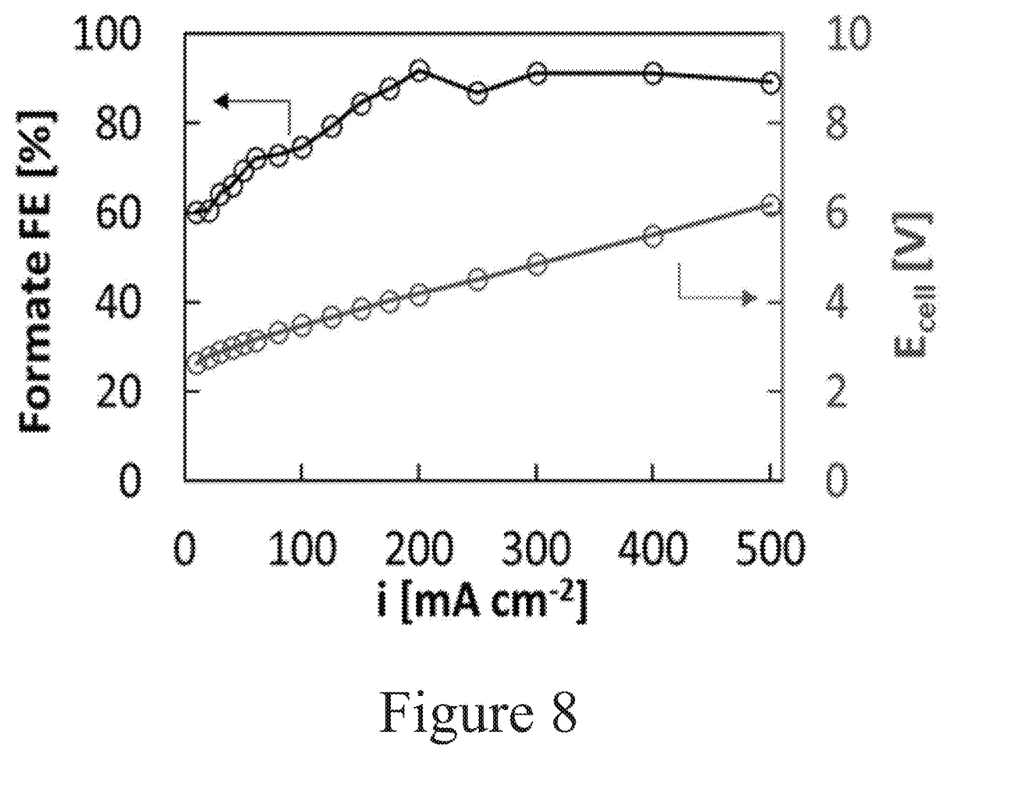
FIG. 8 illustrates the formate FE and polarization curve resulting from an electrochemical flow cell as described herein, according to some embodiments of the present disclosure.
Figure 9:
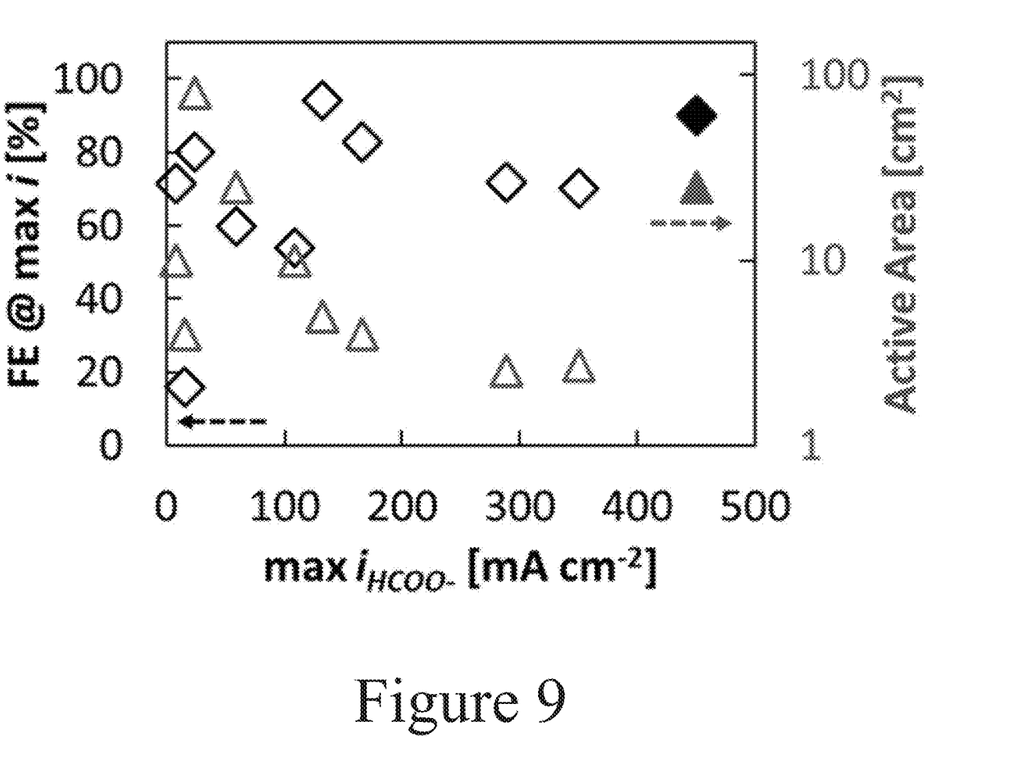
FIG. 9 illustrates a comparison of the formate FE and active area versus the maximum partial current density resulting from an electrochemical flow cell as described herein, according to some embodiments of the present disclosure.

To address these issues, a novel cell architecture was designed and tested. As shown herein, one way to effectively reduce the $H^+$ concentration at the cathode interface is to add an aqueous electrolyte layer to separate the cathode GDE from the membrane. One of the key challenges to incorporating an aqueous electrolyte layer into a $CO_2$ electrolyzer is to balance the buffering effect, maximizing $CO_2R$ selectivity while minimizing resistive ohmic losses. The novelty of the cell architecture developed in this study is the tunable catholyte layer thickness between the cation exchange layer of the BPM and the cathode (see FIGS. 1-6). While a catholyte thickness of 1.27 mm was used in this study, the thickness can be reduced to tens of micrometers upon further refinement. Nevertheless, the current device architecture is sufficient to reduce the concentration of $H^+$ near the electrocatalyst interface through both establishing a concentration gradient through the thickness of the catholyte layer and through the kinetics of $SO_4^{2-}$ protonation. Overall, this architecture can achieve FEs toward formate as high as 90% at current densities of 500 mA $cm^{-2}$, while maintaining a total cell voltage (Ecell) of ≤6 V (see FIG. 8). FIG. 9 illustrates a comparison of the formate FE and active area versus the maximum partial current density, according to some embodiments of the present disclosure.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. An electrochemical flow cell configured for the reduction of carbon dioxide, the electrochemical flow cell comprising:
    a first gap positioned between an ion exchange membrane (IEM) and a cathode gas diffusion electrode (GDE), and
    a cathode flow plate, wherein:
    the cathode GDE is positioned between the IEM and the cathode flow plate,
    the cathode flow plate comprises a serpentine flow path,
    the first gap is configured to contain a liquid, and
    the first gap has a width value, as defined by the distance between the IEM and the cathode GDE, of between about 0.1 mm and about 2.0 mm.

2. The electrochemical flow cell of claim 1, wherein the width is between about 0.1 mm and about 1.0 mm.

3. The electrochemical flow cell of claim 1, wherein the first gap, when filled with the liquid, provides a conductivity of greater than about 5 S/m.

4. The electrochemical flow cell of claim 1, further comprising at least two contacts configured to estimate a voltage drop across the electrochemical cell.

5. The electrochemical flow cell of claim 1, wherein:
    the cathode flow plate further comprises a first inlet and a first outlet, and
    the serpentine flow path fluidly connects the first inlet and the first outlet.

6. The electrochemical flow cell of claim 5, wherein:
    the serpentine flow path comprises three or more channels positioned substantially parallel relative to each other, and
    the channels are configured to maximize contact of the carbon dioxide with a maximum amount of area of the cathode GDE.

7. The electrochemical flow cell of claim 6, wherein:
    each channel comprises a section comprising:
        a first portion which traverses across a first dimension of the cathode flow plate;
        a second portion which crosses a portion of a second dimension of the cathode flow plate, and
        a third portion which traverses across the first dimension of the cathode flow plate, wherein:
        the first dimension is substantially perpendicular to the second dimension,
        when in the first portion, the carbon dioxide flows in a first direction, and when in the third portion, the carbon dioxide flows in a second direction that is substantially opposite to the first direction.

8. The electrochemical flow cell of claim 7, wherein:
each channel comprises two or more sections, and
each section is connected in series to the remaining sections.

9. The electrochemical flow cell of claim 1, further comprising:
a baffled gasket, and
the cathode flow plate further comprises a second inlet and a second outlet, wherein:
the baffled gasket is positioned between the IEM and the cathode GDE,
the baffled gasket forms a second gap between the IEM and the cathode GDE, and
the second inlet and the second outlet are fluidly connected by the second gap.

10. The electrochemical flow cell of claim 1, wherein the cathode GDE comprises an anion exchange ionomer.

11. The electrochemical flow cell of claim 1, wherein the electrochemical flow cell is configured to convert the carbon dioxide to formate.

\* \* \* \* \*